United States Patent [19]

Akagi

[11] 4,368,759
[45] Jan. 18, 1983

[54] ELECTROMAGNETIC FLOW CONTROL VALVE UNIT

[75] Inventor: Motonobu Akagi, Kariya, Japan

[73] Assignees: Aisin Seiki Kabushiki Kaisha, Kariya; Toyota Jidosha Kogyo Kabushiki Kaisha, Toyota, both of Japan

[21] Appl. No.: 212,619

[22] Filed: Dec. 3, 1980

[30] Foreign Application Priority Data

Dec. 11, 1979 [JP] Japan .................................. 54-160588

[51] Int. Cl.³ ............................................ F16K 11/07
[52] U.S. Cl. .............................. 137/625.48; 137/870
[58] Field of Search ....................... 137/625.12, 625.48, 137/625.38

[56] References Cited

U.S. PATENT DOCUMENTS

| | | |
|---|---|---|
| 4,193,421 | 3/1980 | Sakakibara et al. |
| 4,216,938 | 8/1980 | Inada et al. |
| 4,244,388 | 1/1981 | Feiss ........................... 137/625.38 X |
| 4,294,286 | 10/1981 | Ohumi ........................... 137/625.48 |

*Primary Examiner*—Arnold Rosenthal
*Attorney, Agent, or Firm*—Oblon, Fisher, Spivak, McClelland & Maier

[57] ABSTRACT

In an electromagnetic flow control valve unit, a pair of flow control valves are associated with a moving-coil linear motor to simultaneously control each fluid flow into two independent devices in accordance with an electric current applied thereto.

4 Claims, 2 Drawing Figures

ELECTROMAGNETIC FLOW CONTROL VALVE UNIT

BACKGROUND OF THE INVENTION

The present invention relates to electrically operated fluid control valve units, and more particularly to an improvement of an electromagnetic flow control valve unit in which a flow control valve is associated with a moving-coil linear motor to control the quantity of fluid flow in accordance with an electric current applied thereto.

In general such a conventional electromagnetic flow control valve unit as described above comprises a single flow control valve for controlling the quantity of fluid flow from a single inlet port to a single outlet port, which control valve does not serve to simultaneously control each fluid supply into two independent devices.

SUMMARY OF THE INVENTION

It is, therefore, a primary object of the present invention to provide an improved electromagnetic flow control valve unit capable of simultaneously controlling each fluid supply into two independent devices such as a carburetor and an exhaust gas recirculation valve in a vehicle engine control system.

According to the present invention briefly summarized there is provided an electromagnetic flow control valve unit which comprises a housing provided with an inlet port and first and second outlet ports, a longitudinal tubular core arranged within the housing and connected at its opposite ends to the first and second outlet ports, the tubular core being provided therein with a partition member which subdivides the interior of the core into first and second passages respectively opening into the first and second outlet ports and further provided with first and second axial holes permitting each fluid flow between the inlet port and the first outlet port across the first passage and between the inlet port and the second outlet port across the second passage, and a linear motor of the moving-coil type including a permanent magnet arranged within the housing to provide magnetic flux, a bobbin axially slidable on the tubular core, a moving-coil wound around the bobbin and arranged across the magnetic flux of the magnet to generate a linear force on the bobbin in accordance with an electric current applied thereto from an electric circuit, and resilient means for biasing the bobbin to its original position and connecting the moving-coil to the electric circuit. The linear motor is characterized in that the bobbin is formed with axially spaced first and second valve parts respectively cooperating with the first and second axial holes for controlling each quantity of fluid flow passing through the first and second passages.

BRIEF DESCRIPTION OF THE DRAWING

Additional objects and advantages of the present invention will be more readily apparent from the following detailed description of a preferred embodiment thereof when taken together with the accompanying drawing in which.

DESCRIPTION OF THE PREFERRED EMBODIMENT

Figure 1:
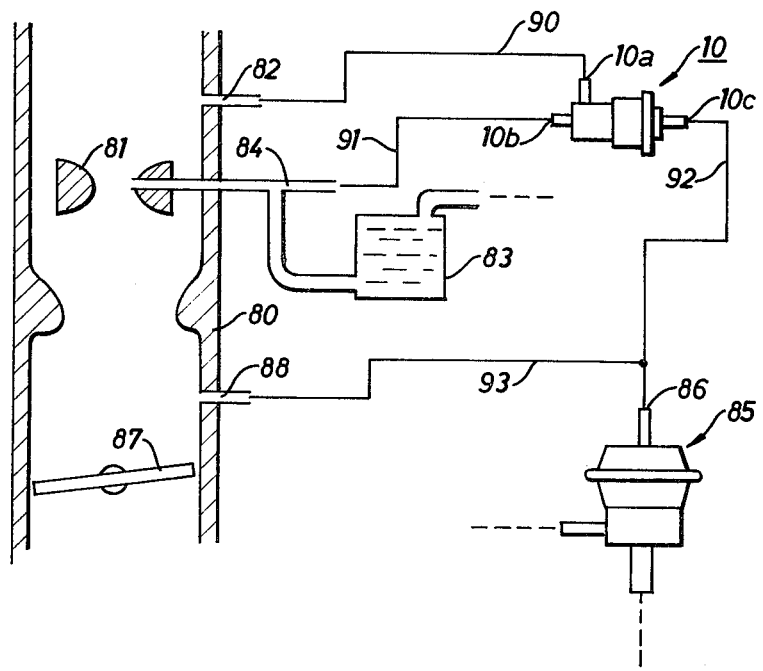
FIG. 1 is a schematic view of a control system for an internal combustion engine, in which an electromagnetic flow control valve unit in accordance with the present invention is adapted.

In FIG. 1 of the drawing, there is schematically illustrated a control system for an internal combustion engine which includes an electromagnetic flow control valve unit 10 in accordance with the present invention. The control valve unit 10 is provided with an inlet port 10a and first and second outlet ports 10b and 10c. The inlet port 10a is connected through a passage 90 to an air port 82 located at the upstream of a venturi 81 in an air induction passage 80. The first outlet port 10b is connected through a passage 91 to a main air-bleed passage 84 of a carburetor 83, and the second outlet port 10c is connected through a passage 92 to a pilot port 86 of a conventional exhaust gas recirculation valve 85. A by-pass passage 93 is connected at its one end to passage 92 and at its other end to an advance port 88 adjacent to a throttle valve 87 in the air induction passage 80. With the arrangement described here, the control valve unit 10 acts to simultaneously control air-fuel ratio and an amount of recirculated exhaust gases upon receipt of an electric signal indicative of operating condition of the engine thereby to purify the exhaust gases with the minimum power losses and fuel consumption.

Figure 2:
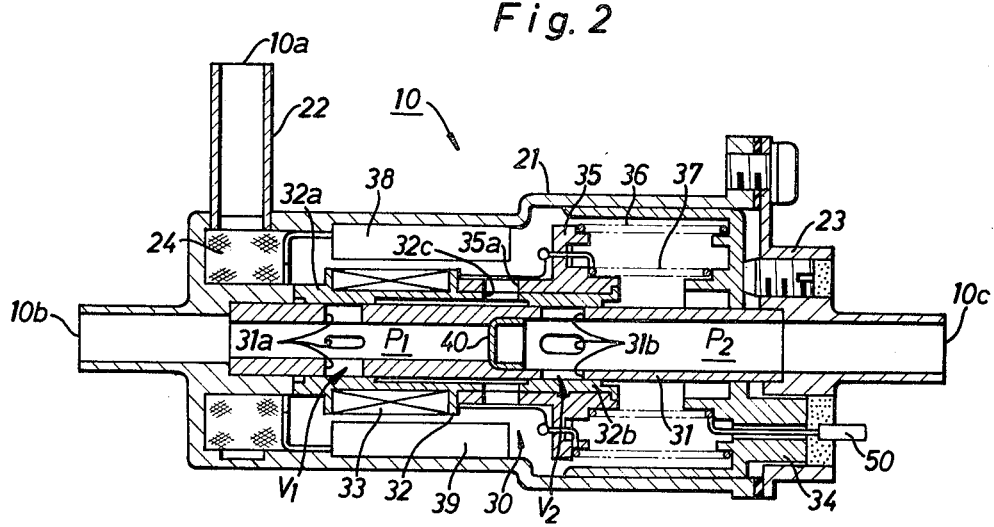
FIG. 2 is an enlarged sectional view of the flow control valve unit shown in FIG. 1.

As shown in FIG. 2, the control valve unit 10 includes a cylindrical housing 21 of magnetic material which is integrally provided with the first outlet port 10b. The cylindrical housing 21 is also provided at its periphery with a radial pipe 22 forming the inlet port 10a and is closed at its open end by means of a cover member 23 of magnetic material in an air tight manner, the cover member 23 being integrally formed with the second outlet port 10c. Assembled within the cylindrical housing 21 are an annular air-filter 24 and a moving-coil linear motor 30. The linear motor 30 comprises a longitudinal tubular core 31 air-tightly secured at its one end to an inner boss of housing 21 and at its other end to the inner wall of cover member 23. The tubular core 31 is provided at its inner shoulder with a partition member 40 which subdivides the interior of core 31 into a first passage $P_1$ in open communication with the first outlet port 10b and a second passage $P_2$ in open communication with the second outlet port 10c.

The moving-coil linear motor 30 further comprises a bobbin 32 of non-magnetic material on which a moving-coil 33 is wound, and a pair of permanent magnets 38 and 39 which are fixed to the inner peripheral wall of housing 21 and opposed to each other. The bobbin 32 is axially slidable on the left-hand portion of tubular core 31, and the permanent magnets 38, 39 are magnetized to provide the same polarity at their opposed inner faces so as to form magnetic flux perpendicularly to the moving-coil 33. Within an annular space around the right-hand portion of tubular core 31, there is provided a cup-shaped spring holder 34 of non-conductive material in which a pair of conductive compression coil springs 36 and 37 are concentrically assembled. The spring holder 34 is adjustable in its axial direction and opposes a flanged sleeve-like spring holder 35 of non-conductive material which is fixedly coupled over the right-hand extension of bobbin 32. The compression coil springs 36 and 37 are interposed between spring holders 34 and 35, and each of springs 36 and 37 is connected at its left end to each terminal of the moving-coil 33 and at its right end to each terminal of a lead wire 50 through the base of spring holder 34. In addition, each right end of springs 36 and 37 is insulated within the spring holder 34. When an electric current is applied to the moving-coil 33 from an electric control circuit across lead wire 50 and springs 36, 37, a linear force generates in proportion to the applied current by Fleming's left-hand rule to move the bobbin 32 in the rightward direction.

To modulate the maximum flow quantity respectively across the first and second outlet ports 10b and 10c, the tubular core 31 is formed at the left-hand portion thereof with a plurality of equidistantly spaced axial holes 31a, and the bobbin 32 is integrally formed at the left-hand inner periphery thereof with a first annular valve part 32a. Thus, the first valve part 32a cooperates with the axial holes 31a to provide a first flow control valve $V_1$ for controlling fluid communication between the inlet port 10a and the first outlet port 10b across the first passage $P_1$ in accordance with the movement of bobbin 32 caused by operation of the linear motor 30. The tubular core 31 is further formed at the right-hand portion thereof with a plurality of equidistantly spaced axial holes 31b, and the bobbin 32 is integrally formed at the right-hand inner periphery thereof with a second annular valve part 32b. Thus, the second valve part 32b cooperates with the axial holes 31b to provide a second flow control valve $V_2$ for controlling fluid communication between the inlet port 10a and the second outlet port 10c across radial holes 32c, 35a, respectively formed in the bobbin 32 and spring holder 35, and the second passage $P_2$.

In operation, when the moving-coil 33 is deenergized, the bobbin 32 is engaged at the left end thereof with the inner boss of housing 21 due to the biasing force of springs 36 and 37 such that both the axial holes 31a and 31b are fully closed by the valve parts 32a and 32b of bobbin 32. This results in interruption of each fluid communication between the inlet port 10a and the first outlet port 10b and between the inlet port 10a and the second outlet port 10c. When the moving-coil 33 is energized by an electric current through springs 36, 37, the bobbin 32 is displaced rightwards against the biasing force of springs 36, 37 in accordance with a value of the current through moving-coil 33 so that each opening area of axial holes 31a and 31b is simultaneously modulated in accordance with the displacement of bobbin 32. Thus, the air flowing into inlet port 10a passes through the first flow control valve $V_1$, first passage $P_1$, and first outlet port 10b and is then supplied into the main air-bleed passage 84 of carburetor 83 through passage 91. Simultaneously, the air from inlet port 10a passes through the second flow control valve $V_2$, second passage $P_2$, and second outlet port 10c and is then supplied into the pilot port 86 of exhaust gas recirculation valve 85 through passage 92. Consequently, the air flow into main air-bleed passage 84 controls the air-fuel ratio in carburetor 83, and the air flow into pilot port 86 controls the pilot pressure in exhaust gas recirculation valve 85, causing adjustment of the operation of valve 85.

From the above description, it will be understood that the flow control valve unit 10 acts to simultaneously control the air supply into two independent devices such as the carburetor 83 and the exhaust gas recirculation valve 85. It will be also understood that the flow control valve unit 10 can be manufactured with a low cost in a simple construction owing to provision of the first and second flow control valves $V_1$ and $V_2$ on the common tubular core 31.

Although the flow control valve unit 10 is adapted to control the air supply into main air-bleed passage 84 of carburetor 83 and into the pilot port 86 of exhaust gas recirculation valve 85, it may be adapted to control the air supply into the main air-bleed passage and an air passage for slow speed control. In the practical use of the flow control valve unit 10 for various two independent devices, the valve parts 32a, 32b and axial holes 31a, 31b may be modified in their shapes and number to change the flow quantity control timing and ratio by the respective flow control valves $V_1$ and $V_2$. It is further noted that the control valve unit 10 may be modified in such a manner that the opening area of the second flow control valve $V_2$ decreases in accordance with increase of the opening area of the first flow control valve $V_1$.

In the above description, while the fundamental features of the invention have been explained with reference to a specific embodiment, it will be understood that various omissions and substitutions in the device as illustrated may be made by those skilled in the art without departing from the spirit of the present invention.

What is claimed is:

1. An electromagnetic flow control valve unit comprising:

a housing provided with an inlet port and first and second outlet ports;

a longitudinal tubular core arranged within said housing and connected at its opposite ends to said first and second outlet ports, said tubular core being provided therein with a partition member which subdivides the interior of said core into first and second passages respectively opening into said first and second outlet ports and further provided with first and second axial holes permitting each fluid flow between said inlet port and said first outlet port across said first passage and between said inlet port and said second outlet port across said second passage; and a linear motor of the moving-coil type including a permanent magnet arranged within said housing to provide magnetic flux, a bobbin axially slidable on said tubular core, a moving-coil wound around said bobbin and arranged across the magnetic flux of said magnet to generate a linear force on said bobbin in accordance with an electric current applied thereto from an electric circuit, and resilient means for biasing said bobbin to its original position and connecting said moving-coil to said electric circuit;

said bobbin formed at its inner periphery with axially spaced first and second valve parts and at its peripheral wall with a radial hole between said first and second valve parts, said first valve part cooperating with said first axial hole to provide a first flow control valve for controlling fluid communication between said inlet port and said first outlet port across said first passage, and said second valve part cooperating with said second axial hole to provide a second flow control valve for controlling fluid communication between said inlet port and said second outlet port across said radial hole and said second passage, and said first and second flow control valves arranged to be simultaneously closed and opened in accordance with axial movement of said bobbin.

2. An electromagnetic flow control valve unit as claimed in claim 1, wherein said tubular core is provided in its peripheral wall with a plurality of equidistantly spaced first axial holes permitting the fluid flow between said inlet port and said first outlet port across said first passage and with a plurality of equidistantly spaced second axial holes permitting the fluid flow between said inlet port and said second outlet port across said second passage.

3. An electromagnetic flow control valve unit as claimed in claim 1, wherein said inlet port is a radial port provided on said housing, and said first and second outlet ports are a pair of coaxial ports provided at the opposite ends of said housing.

4. An electromagnetic flow control valve unit as claimed in claim 1, comprising:
an annular clearance formed between said first and second valve parts of said bobbin to communicate said radial hole into said second axial hole therethrough.

* * * * *